United States Patent
Zheng et al.

(10) Patent No.: US 8,415,606 B2
(45) Date of Patent: *Apr. 9, 2013

(54) CONFIGURABLE PHOTO DETECTOR CIRCUIT

(75) Inventors: Dong Zheng, San Jose, CA (US); Daryl Chamberlain, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,401

(22) Filed: Dec. 16, 2011

(65) Prior Publication Data

US 2012/0091320 A1 Apr. 19, 2012

Related U.S. Application Data

(60) Continuation of application No. 12/627,310, filed on Nov. 30, 2009, now Pat. No. 8,097,840, which is a division of application No. 11/863,858, filed on Sep. 28, 2007, now Pat. No. 7,635,836.

(60) Provisional application No. 60/890,942, filed on Feb. 21, 2007.

(51) Int. Cl.
*G01J 1/44* (2006.01)
*G02B 5/32* (2006.01)

(52) U.S. Cl.
USPC .......... 250/208.2; 250/214 R; 369/44.37

(58) Field of Classification Search .......... 250/214 SW, 250/214 R, 208.1, 208.2; 369/44.37, 44.27; 348/308, 319
See application file for complete search history.

(56) References Cited

U.S. PATENT DOCUMENTS

| | | | |
|---|---|---|---|
| 4,816,910 A * | 3/1989 | Hashimoto et al. | 348/247 |
| 5,581,094 A | 12/1996 | Hara et al. | |
| 6,054,703 A | 4/2000 | Liu | |
| 6,249,618 B1 | 6/2001 | Hou | |
| 6,512,608 B2 | 1/2003 | Ohyama | |
| 6,759,641 B1 | 7/2004 | Loose | |
| 7,635,836 B2 | 12/2009 | Zheng | |
| 7,663,087 B2 | 2/2010 | Zheng | |
| 7,952,062 B2 * | 5/2011 | Zheng et al. | 250/214 R |
| 2006/0164533 A1 | 7/2006 | Hsieh et al. | |
| 2008/0197270 A1 | 8/2008 | Zheng et al. | |
| 2008/0205820 A1 | 8/2008 | Zheng et al. | |
| 2010/0074070 A1 | 3/2010 | Zheng | |
| 2010/0177625 A1 | 7/2010 | Zheng | |
| 2011/0198485 A1* | 8/2011 | Zheng et al. | 250/214 R |
| 2012/0091320 A1* | 4/2012 | Zheng et al. | 250/208.2 |

OTHER PUBLICATIONS

U.S. Patent and Trademark Office, "Notice of Allowance", "U.S. Appl. No. 11/863,858", Oct. 5, 2009, pp. 1-11.

(Continued)

*Primary Examiner* — John Lee
(74) *Attorney, Agent, or Firm* — Fogg & Powers LLC

(57) ABSTRACT

A configurable photo detector circuit comprises a photo detector array including a plurality of photo detectors coupled to a plurality of amplifiers. A method for programming a detection pattern of the configurable photo detector circuit comprises selecting a first detection pattern for the photo detector array, generating first signals to create the first selected detection pattern, and applying the first generated signals to the photo detector circuit to implement the first selected detection pattern.

13 Claims, 8 Drawing Sheets

OTHER PUBLICATIONS

U.S. Patent and Trademark Office, "Restriction Requirement", "U.S. Appl. No. 11/863,858", Apr. 6, 2009, pp. 1-6.

U.S. Patent and Trademark Office, "Notice of Allowance", "U.S. Appl. No. 12/627,310", Oct. 28, 2011, pp. 1-7.

U.S. Patent and Trademark Office, "Office Action", "U.S. Appl. No. 12/627,310", Jun. 9, 2011, pp. 1-9.

U.S. Patent and Trademark Office, "Restriction Requirement", "U.S. Appl. No. 12/627,310", Feb. 17, 2011, pp. 1-8.

* cited by examiner

|       |      |      |      |      |      |
|-------|------|------|------|------|------|
| A11   | A12  | A13  | B11  | B12  | B13  |
| A21   | A22  | A23  | B21  | B22  | B23  |
| A31   | A32  | A33  | B31  | B32  | B33  |
| D11   | D12  | D13  | C11  | C12  | C13  |
| D21   | D22  | D23  | C21  | C22  | C23  |
| D31   | D32  | D33  | C31  | C32  | C33  |

Bank A / Bank B / Bank D / Bank C

CONFIGURABLE PHOTO DETECTOR CIRCUIT

CROSS-REFERENCE TO RELATED APPLICATIONS

This application is a continuation of U.S. patent application Ser. No. 12/627,310 entitled "CONFIGURABLE PHOTO DETECTOR CIRCUIT" (currently pending) filed Nov. 30, 2009 (the '310 application), which is a divisional of U.S. patent application Ser. No. 11/863,858 entitled "CONFIGURABLE PHOTO DETECTOR CIRCUIT" filed on Sep. 28, 2007 (the '858 application) which issued as U.S. Pat. No. 7,635,836, which claims priority to Provisional Application No. 60/890,942 entitled "FIELD PROGRAMMABLE PHOTO DETECTOR ARRAY" filed on Feb. 21, 2007 (the '942 application). The '310 application, the '858 application and the '942 application are each incorporated by reference in their entirety into the present application.

BACKGROUND

A conventional optical pick-up (OPU) apparatus enables information to be recorded, reproduced and erased with respect to a CD group disc (e.g. CD, CD-ROM, CD-R and CD-RW) and a DVD group disc (e.g. DVD, DVD-ROM, DVD-RAM, DVD-R and DVD-RW, DVD+R, DVD+RW), as well as to write/read more recently introduced Blu-ray discs and/or HD-DVD format discs, with single or multiple layer formats. As known in the art, the OPU generally has an infrared semiconductor laser device for CD (about 780 nm), and a red semiconductor laser device for DVD (about 650 nm) and/or a blue laser device for Blu-ray/HD-DVD (about 405 nm). The OPU includes photo detector IC (PDIC), and power monitor integrated circuit (PMIC), which both generally provide a fixed detection pattern.

In typical applications, each laser beam, such as infrared (780 nm for CD), red for DVD (about 650 nm) and blue (405 nm for Blu-ray and HD-DVD) is split to 3 beams by optical gratings, forming a central beam (zero order) and two side beams (first order). The center beam reads the disc data, while the side beams help to keep the beam in the disc track.

One problem during development of PDICs and PMICs for optical pickup units (OPUs) relates to the need to select a photo detector detection pattern before testing the system, since available photo detectors provide a fixed detection pattern and modeling is not currently possible. Unfortunately, testing may reveal a fixed pattern initially specified does not provide the desired detector performance.

For example, one issue for the optical storage industry is related to the unpredictable introduction of interference patterns on the servo tracking signal caused by unwanted optical reflections when reading dual layer Blu-ray media. This issue can require a redesign of the photo detector patterns on the PDIC, thus leading to a time an expensive, time consuming and highly iterative design process.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A configurable photo detector circuit comprises a photo detector array including a plurality of photo detectors coupled to a plurality of amplifiers. A method for programming a detection pattern of the configurable photo detector circuit comprises selecting a first detection pattern for the photo detector array, generating first signals to create the first selected detection pattern, and applying the first generated signals to the photo detector circuit to implement the first selected detection pattern.

BRIEF DESCRIPTION OF THE DRAWINGS

A fuller understanding of the present invention and the features and benefits thereof will be accomplished upon review of the following detailed description together with the accompanying drawings, in which:

FIG. 2($b$) shows an exemplary photodetector pattern layout for a configurable photo detector integrated circuit according to an embodiment of the invention.

DETAILED DESCRIPTION

Figure 1:
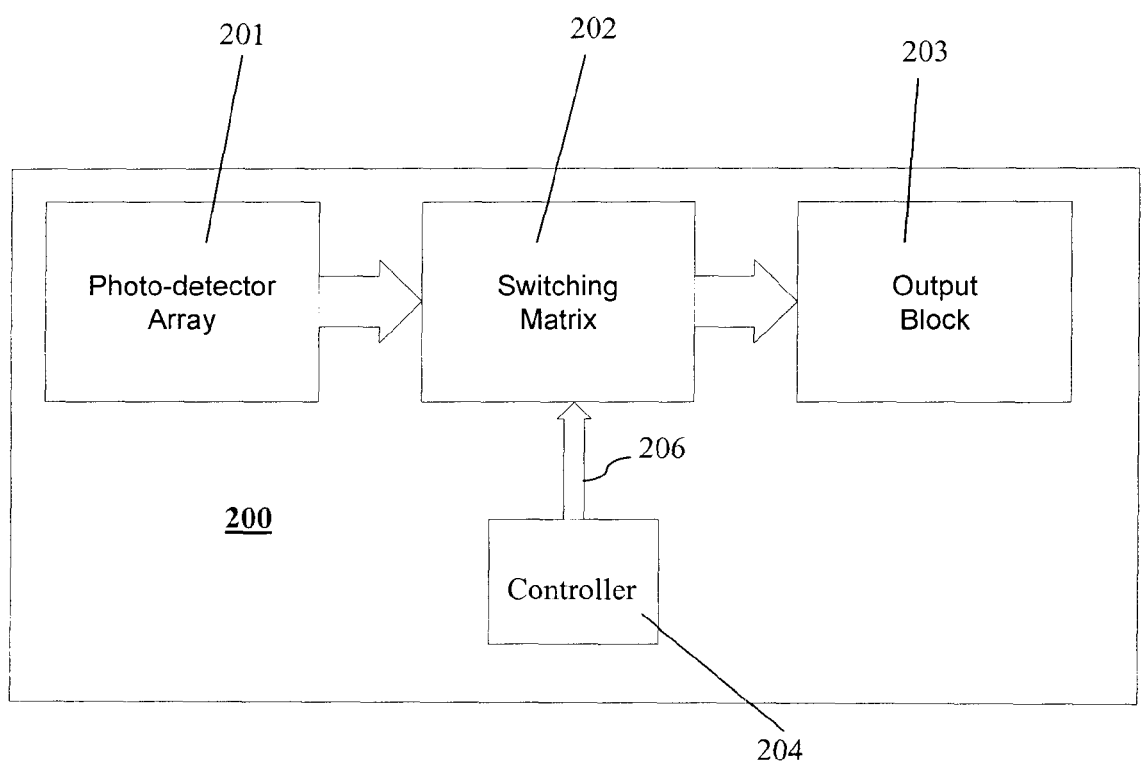
FIG. 1 shows a top level block diagram of a configurable photo detector integrated circuit according to an embodiment of the invention.

Embodiments of the present invention are more particularly described in the following description and examples that are intended to be illustrative only since numerous modifications and variations therein will be apparent to those of ordinary skill in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of".

A photo detector array integrated circuit having a field configurable detection pattern according to an embodiment of the invention, generally referred to herein as a configurable photo detector circuit, comprises a photo detector array comprising a plurality of photo detectors. The photo detectors may be grouped into banks. Each of the banks comprises a plurality of photo detectors for receiving light and outputting electrical signals. A switching matrix having a first plurality of inputs is coupled to outputs of the plurality of photo detectors. The switching matrix is generally referred to herein as a two-dimensional matrix, based on the switching matrix having a plurality of rows and columns. The switching matrix also includes a second plurality of inputs for receiving control signals which controls operation of the switches, such as for selecting from a plurality of different switch configurations. The switching matrix also provides a plurality of matrix outputs. A controller is coupled to the second plurality of inputs of the switching matrix for controlling the switching matrix.

In some embodiments, the controller includes a serial interface. The controller allows users to use external programming to set specific ones of the plurality of different switch configurations. An output block comprising a plurality of amplifiers is coupled to the switching matrix outputs for providing a plurality of amplified outputs, wherein the electrical signals from the photo detectors are generally directable to any of the plurality of amplifiers based on the externally programmable switch configuration.

As used herein, the term "photo detector array" refers to a plurality of photo detectors arranged in a pattern. The pattern can be a regular order or arrangement, or an irregular and even random pattern of photo detectors.

Embodiments of the invention thus provide a method for programming a detection pattern of the configurable photo detector (such as PDICs and PMICs and related OPUs) which allow the user/customers to change and thus customize the photo detector detection pattern through iterative testing of the photo detector array pattern. The photo detector pattern can be electronically changed until one or more performance related criteria are obtained, thus removing much of the conventional uncertainty associated with the user/customer investing in a custom IC with a fixed photo detector pattern.

FIG. 1 shows a top level block diagram of a configurable photo detector integrated circuit 200 according to an embodiment of the invention. Configurable photo detector circuit 200 includes a photo detector array 201 comprising a plurality of photo detectors, such as photodiodes, which is coupled to a switching matrix 202. A controller 204 allows programming of switching matrix 202, such as using an I²C control bus, which is coupled to the switching matrix 202, to effectuate changes in the switch configuration provided by switching matrix 202. The programming can be external programming. Bus lines 206 from controller 204 are generally coupled to the gates (or other control inputs) of transistors in the switching matrix 202 to control switching. The outputs of switching matrix 202, generally referred to as matrix outputs, are coupled to inputs of output block 203.

FIG. 2(a) shows an exemplary photo detector array 201 according to an embodiment of the invention having 4 banks (banks A, B, C and D), with each bank comprising a 3×3 photo detector array. The lines between the photo detectors represent electrical isolation between respective photo detectors, such as spaced apart on the order of several microns. Although the banks in FIG. 2(a) are shown as being the same size and shape, the sizes and shapes of the photo detectors can be different between banks, and there can be similar banks at different locations on the integrated circuit.

The array 201 is generally configured to provide a main (center) channel and two (2) side channels for PDICs adapted for optical pickup unit (OPU) applications. For example, for such a PDIC application, the circuit would generally include a center cluster comprising one or more banks, with the side clusters comprising one or more photo detector banks spaced apart on respective sides of the center cluster.

Figure 2B:
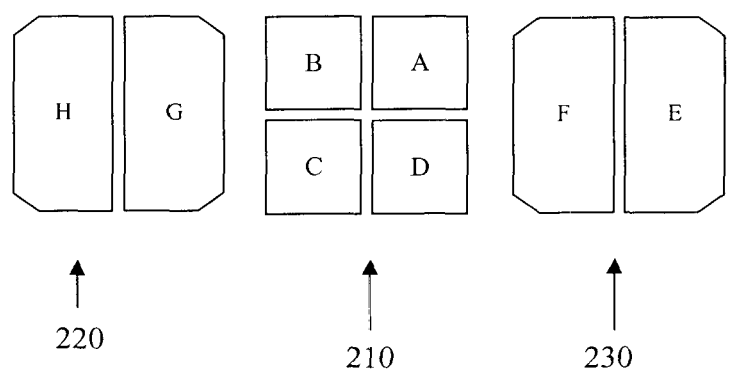
FIG. 2($a$) shows an exemplary photo detector array according to an embodiment of the invention.

FIG. 2(b) shows a PDIC pattern layout showing photo detector center bank 210, and a pair of side channel photo detector banks 220 and 230, that can be implemented as configurable photo detector integrated circuit according to an embodiment of the invention to provide a configurable detection pattern. Center (main) photo detector bank 210 is shown comprising sectors A, B, C and D. For optimal performance, the side beam should generally land at the center of the 2 sections of the side photo detector pattern (i.e., between H&G for photo detector 220 and between F&E for photo detector 230). However, for different wavelengths, the location of the side channel photo detectors would generally need to be different for the various wavelengths for the respective side beams to land at the center of the 2 sections of the side photo detector pattern. Configurable photo detectors according to an embodiment of the invention overcome the limitation of conventional fixed photo detector detection patterns, and in one embodiment allowing side beam centering for multiple wavelengths, such as DVD (about 650 nm), CD (780 nm) and Blu-ray and HD-DVD (405 nm).

Figure 3:
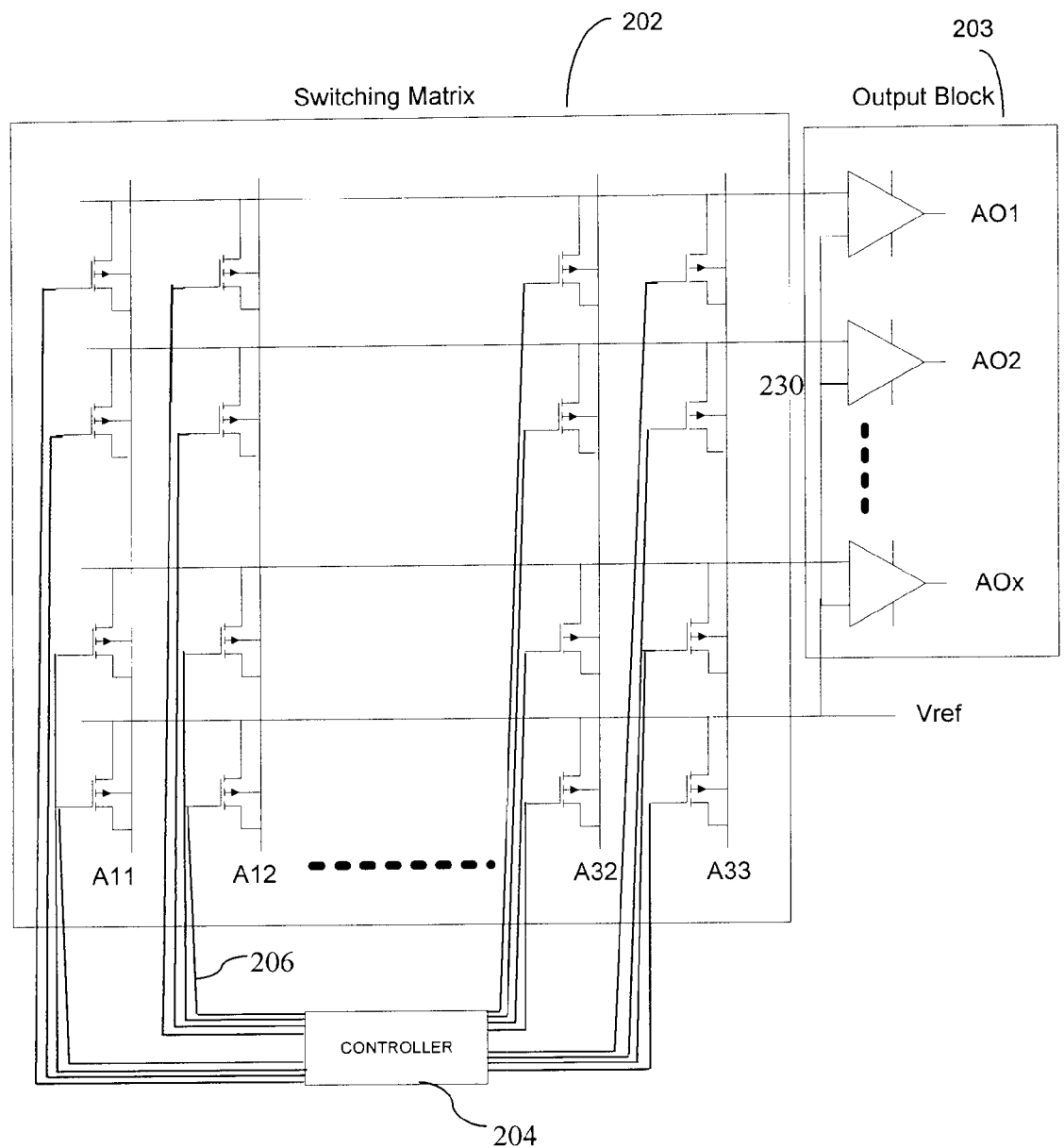
FIG. 3 shows a switching matrix and output block for a configurable photo detector circuit according to an embodiment of the invention.

FIG. 3 shows an exemplary switching matrix 202 and output block 203 shown for simplicity as being only bank A shown in FIG. 2(a), according to an embodiment of the invention. Switching matrix 202 comprises an array of PMOS FETs. Connections 206 are shown from controller 204 to the gates of the PMOS FETs. Output block 203 comprises a plurality of amplifiers, $A_{O1}, A_{O2} \ldots A_{OX}$ that are dedicated to processing signals from bank A photo detectors (A11, A12 ... A23, A33). In one embodiment PMOS transistors are used in switching matrix 202 because switching is generally accomplished at a high bias voltage, such as around 3 volts for a 3.3 volt power supply. Although PMOS FETs are shown, NMOS FETs can be used, or bipolar transistors of either type, or other types of switches. Electrical outputs from the respective photo detectors in bank A (A11, A12 ... A23, A33) are shown as coupled to the sources of PMOS transistors in the switching matrix 202 as shown in FIG. 3. Drains of the PMOS transistors in switching matrix are coupled to inputs of amplifiers $A_{O1}, A_{O2} \ldots A_{OX}$ in output block 203. Outputs from respective photo detectors (e.g. All) generally switch to one and only one output of output block 203 (e.g. $A_{O1}, A_{O2} \ldots A_{OX}$ or Vref), and multiple photo detectors (e.g. A11 and A12) can be switched to the same output (e.g. $A_{O1}$) of output block 203. The unused photo detectors are preferably switched to Vref to minimize loss of photo current to unbiased photo detectors. "Unused", as used herein, refers to photo detectors that are not coupled to the output block 203 by switching matrix 202. Unbiased photo detectors, as used herein, refers to photo detectors that are not biased, as opposed to photo detectors in normal operation which are preferably biased at a higher voltage to increase their speed.

In certain applications, such as when a simplified PCB trace design is needed, or based on the complexity of the photo detector pattern selected by a customer, such as for a blue (405 nm) drive, there may be a requirement for switching between different photo detector banks to provide output combinations which include photo detectors from different photo detector banks. As noted above, the arrangement shown in FIG. 3 dedicates output block amplifiers to one of the plurality of photo detector banks. The arrangement shown in FIG. 3 thus does not allow switching between output block amplifiers between different photo detector banks.

Figure 4:
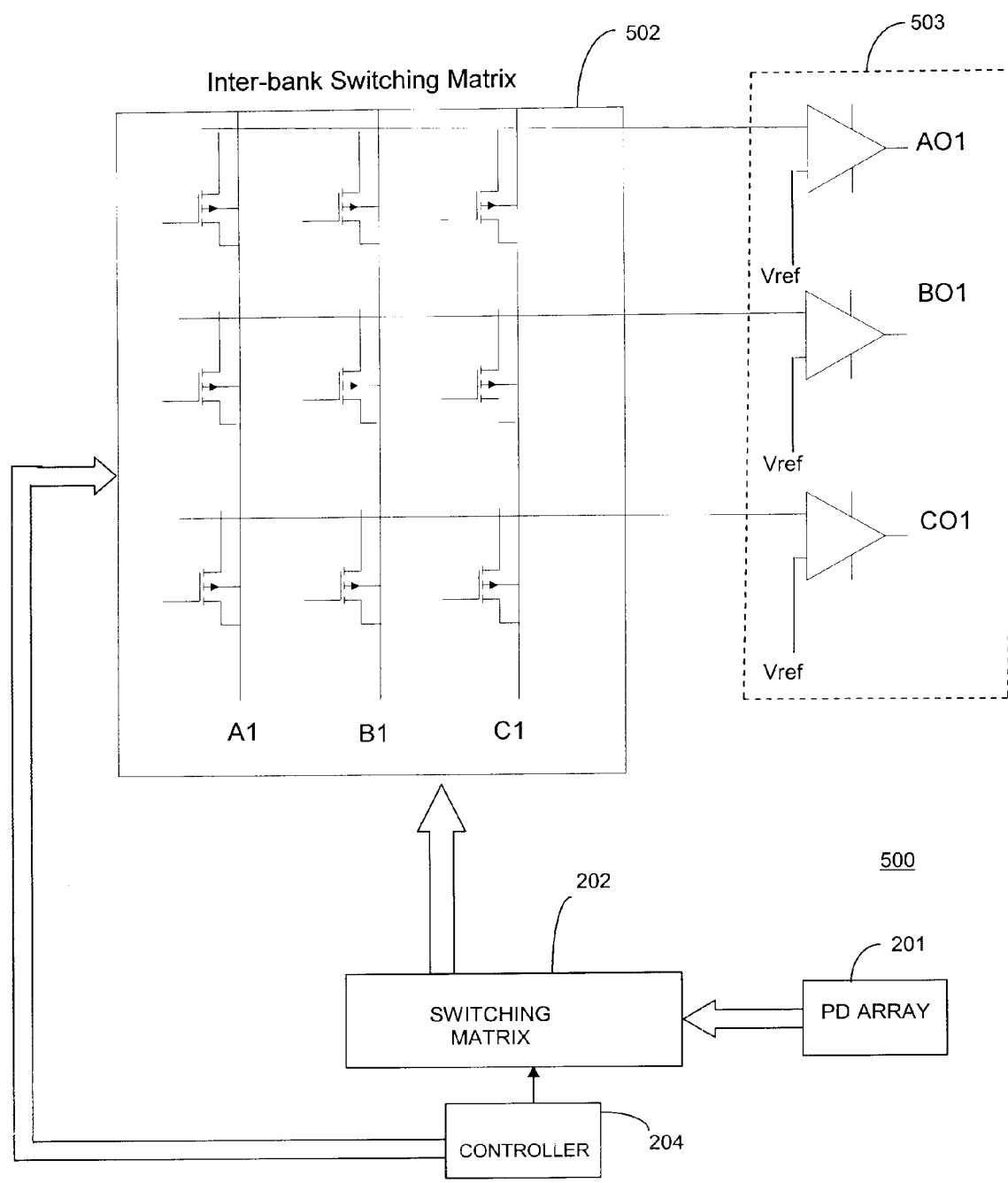
FIG. 4 shows a configurable photo detector integrated circuit according to another embodiment of the present invention.

FIG. 4 shows a configurable photo detector circuit 500 according to an embodiment of the present invention that provides switching of output block amplifiers between different photo detector banks. Configurable photo detector circuit 500 adds an inter-bank switching matrix 502, which is interposed between switching matrix 202 (which is associated with photo detector array 201 and controller 204) and an output block shown as 503. Inputs from switching matrix 202 to the source of PMOS switches comprising inter-bank switching matrix 502 are shown in simplified form as A1, B1 and C1. A1 can represent combined outputs from photo detectors A11, A12 and A13 shown in FIG. 2, for example. Inter-bank switching matrix 502 is controlled by controller 204, such as using a serial control interface, or a separate/dedicated serial control interface. The outputs from inter-bank switching matrix 502 are coupled to output block 503. Inter-bank switching matrix allows outputs from photo detectors in any bank (e.g. A, B, C, or D) to be coupled to any of the output amplifiers, and in one embodiment, in any combination.

Configurable photo detector circuits according to an embodiment of the present invention can be both I²C master and slave. For example, the configurable photo detector circuit can either be programmed through I²C, or read configuration data from EEPROM through I²C. The serial interface used however is not limited to I²C, since it can be any interface that allows external user programming of the device.

Figure 5:
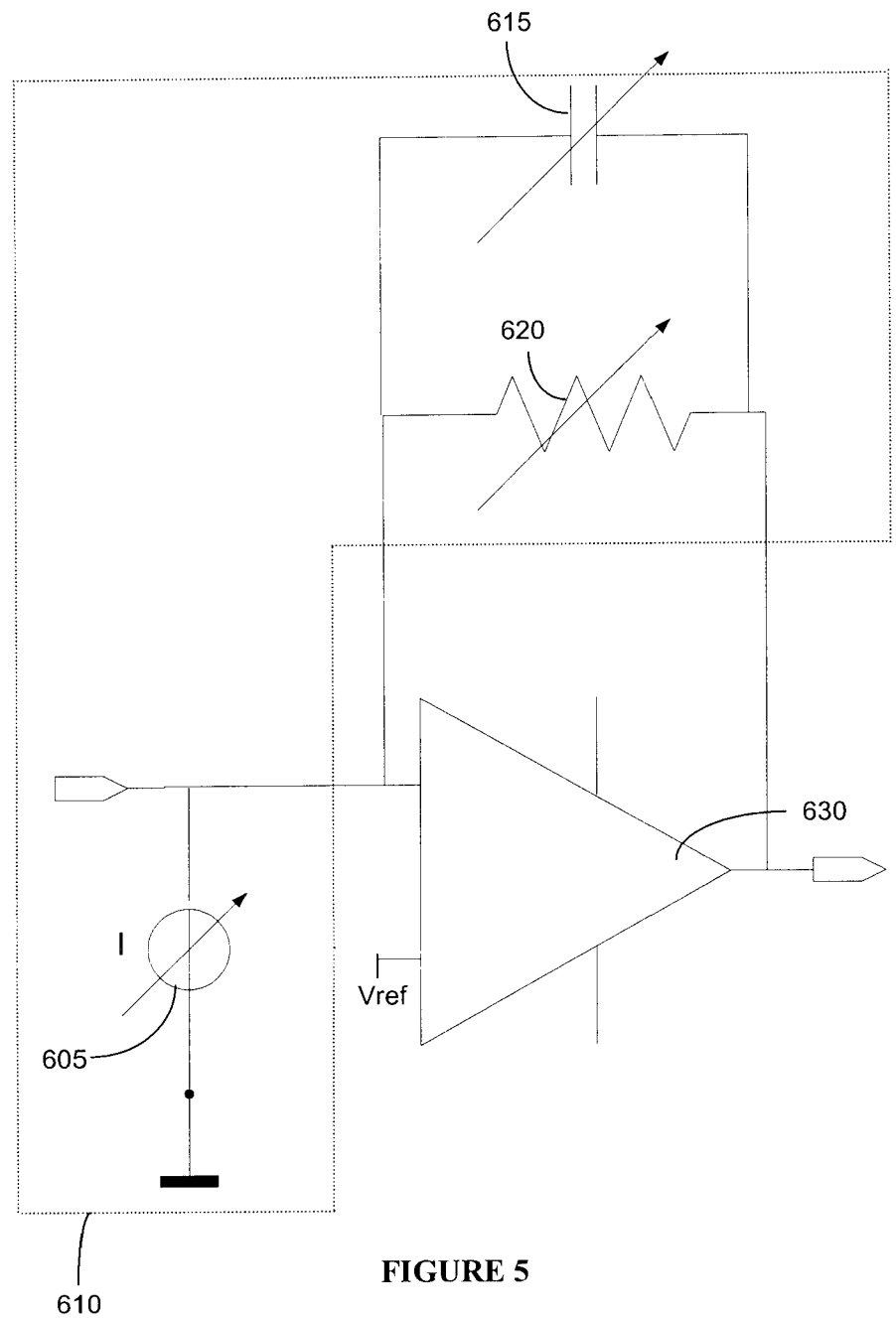
FIG. 5 shows a simplified exemplary circuit amplifier arrangement according to an embodiment of the invention.

The amplifier gain, bandwidth and offset for amplifiers in output blocks 203 and 503 can also be externally adjusted. In addition, the amplifier gain, bandwidth and offset for amplifiers in the output block, such as A01 and A02 shown in FIG. 3, can be externally adjusted. FIG. 5 shows a simplified exemplary circuit arrangement 610 which permits external adjustment of dc and ac parameters of amplifier 630, according to an embodiment of the invention. Offset adjustment is accomplished using variable current source 605, while gain and bandwidth of the output amplifiers can be modified, for example, using the variable feedback RC network shown comprising a variable capacitor 615 and variable resistor 620. As known in the art, externally applied digital inputs to pinout pins provided can be used to set the current source level, as well as the feedback resistor and capacitor values, and the gain. For example, in one embodiment, the gain can be set by a digital input based on a triple level input control.

Figure 6:
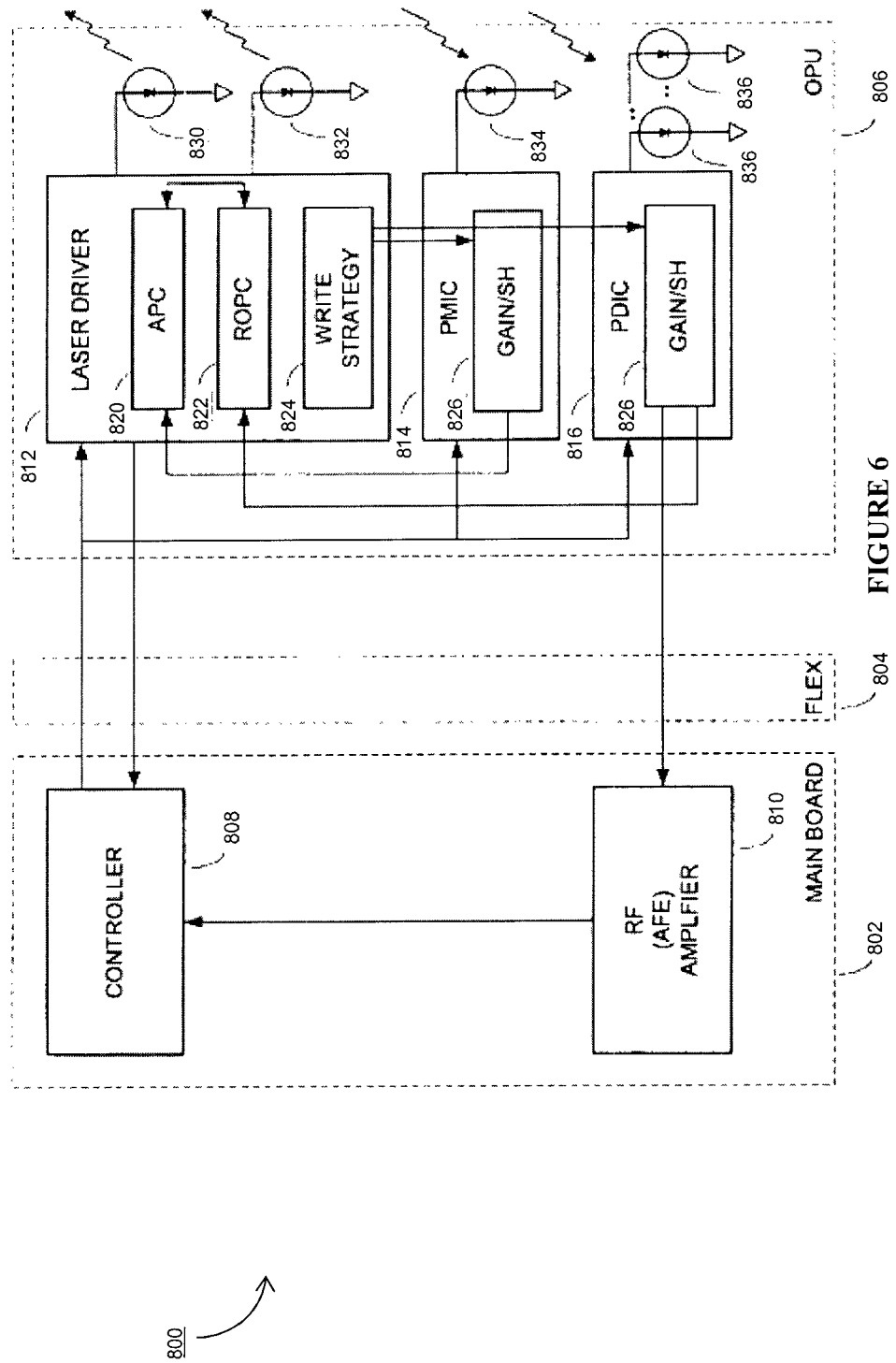
FIG. 6 is a schematic of an exemplary optical pickup unit (OPU) that is prototyped using a configurable photo detector integrated circuits according to an embodiment of the present invention.

FIG. 6 shows portions of an information recording/reproducing apparatus 800, including a main circuit board 802, a flex cable 804 and an optical pick-up unit (OPU) 806 according to an embodiment of the invention. As described below, the OPU 806, and thus apparatus 800, can be prototyped using one or more configurable photo detector circuits according to the present invention to enable rapid design of PDICs and/or PMICs used in OPU 806, such as PDICs and/or PMIC ASICs. The description below of apparatus 800 is based on commonly assigned U.S. Publication No. 20040202072 to Rees et al. The main board 802 includes a controller 808 and an analog front end (AFE) 810. The OPU 806 includes a laser driver integrated chip (LDIC) 812, a power monitor integrated chip (PMIC) 814 and a photo-detector integrated chip (PDIC) 816. As noted above, PMIC 814 and/or PDIC 816 can be ASICs that have detection patterns that are determined using configurable photo detector circuits according to an embodiment of the invention.

The LDIC 812 controls the current to laser diodes 830 and 832, causing one of the laser diodes 830 or 832 to output a light signal that, after being appropriately focused by an optical system (not shown), is incident on an a optical media disk (not shown). In the embodiment shown, the LDIC 812 includes an automatic power control (APC) portion 820, a running optical power control (ROPC) portion 822 and a write strategy generator 824.

The LDIC 812 is shown as being capable of driving two different laser diodes 830 and 832. The LDIC 812 can also drive more than two laser diodes. For example, the LDIC 812 can be capable of driving a first laser diode that outputs a wavelength of 780 nm, a second laser diode that outputs a wavelength of 655 nm, and a third laser diode that outputs a wavelength of 405 nm. Of course, the laser diodes can output light signals of other wavelengths.

The write strategy generator 824 implements an appropriate write strategy, which may depend, for example, on the media, DVD or CD standards, and/or speed being supported. The ROPC 822 uses (e.g., modulates) the APC signals to compensate for variations in the optical media. The APC 820 controls the laser diode to compensate for changes in the laser diode's characteristics.

A photo-detector 834 detects optical signals output by laser diode 830 or 832 before the light signals reach the media, and provides a signal representative of the detected intensity to the PMIC 814. In contrast, multiple photo-detectors 836 generally detect the optical signal that has been reflected from the media (e.g., DVD, CD or Blu-ray media). An information signal produced by photo-detectors 836 includes user data (e.g., to be provided to a host in response to a read request from the host), servo information (e.g., used for servo control) and amplitude information. Samples of the amplitude of the information signal produced by the PDIC 816 are provided to the ROPC 822, which adjusts the power signal and current signal in the APC to compensate for variations in the media, as discussed below. Samples of the signal produced by the photo-detector 834, in contrast, are used by the APC 820, such as to compensate for environmental variations and aging of the laser diodes 830 and 832.

As shown in FIG. 6, the PMIC 814 and the PDIC 816, each include their own dedicated offset, gain and sample-and-hold (gain/SH) circuits 826 and 828. This enables the PMIC 814 to amplify and sample the analog monitoring signal produced by photo-detector 834. This also enables the PDIC 816 to amplify and sample the analog information signal produced by photo-detectors 836.

The samples of the information signal produced by the PDIC 816 are sent up the flex cable 804 to the AFE 810, which performs front end signal processing, such as converting analog data to digital data, and controlling focusing and tracking servo loops. The AFE 810 provides a digital signal to the controller 808, as shown in FIG. 6.

In summary, configurable photo detector circuits having externally configurable photo detector detection patterns according to the invention have a number of significant advantages, many being advantageous for prototyping an OPU including, but not limited to:

i) ability to integrate multiple PDICs previously required to process multiple wavelengths (e.g. different media types) into a single IC;

ii) ability to optimize the photo detector detection pattern for each media type;

iii) improved signal to noise ratio (SNR) with optimized photo detector size/patterns;

iv) greater optics design flexibility, and v) improved PMIC sensitivity since larger beam spot may be used to relax optical alignment and accompanying lower power density. Users can configure the PMIC to combine multiple (e.g. all) photo detector segments to form a larger area detector to increase device sensitivity.

Embodiments of the invention can be applied PDICs, PMICs, or IPUs including PDICs, and/or PMICs, for conventional CD/DVD as well as to write/read emerging Blu-Ray discs and/or HD-DVD format discs, with single or multiple layer formats. Embodiments of the invention may also be applied to generic optical storage technologies or other applications that incorporate similar photo-sensing techniques.

As noted in the Background above, one significant problem during development of PDICs and PMICs for OPUs relates to the need to select a photo detector detection pattern before testing the overall system, since available photo detectors provide a fixed detection pattern and modeling is not currently possible. Historically, this type of development was accomplished by simultaneously developing the optics design and light path, and developing a customized photo detector pattern to match the optics configuration. This development cycle may consist of multiple iterations and through a combination of historical design considerations, near-modeling of the optics and electrical systems, and successive trial and error iterations, an optimal or pseudo-optimal configuration and optics design is eventually generally reached. The primary disadvantage of this method is the long cycle times when the iterative process requires several new photo detector pattern or optics system, as it typically does in certain applications. As described above, configurable integrated circuits according to the present invention provide an externally programmable photo detector pattern for PDICs and PMICs.

Configurable integrated circuits according to an embodiment of the invention embodied as configurable PMICs will now be described in an exemplary use for rapidly prototyping of an OPU to provide accelerated customer development which enables reduction in risk, accelerated time-to-market, and to produce cost effective solutions that can span multiple product generations. Commercially available complete reference design platforms including firmware and board support packages can be obtained. The development platform is operable to adjust or configure various parameters of the PDIC, including output voltage offsets, gains for the various read/write modes and media types, as well as the photo detector pattern or configuration. This programmability provides the customer with an increased level of flexibility and performance when designing the hardware of the optical system. In the specific example of the configurable photo detector pattern, the design of the optics path and the photo detector pattern shape and locations are closely related.

Figure 7:
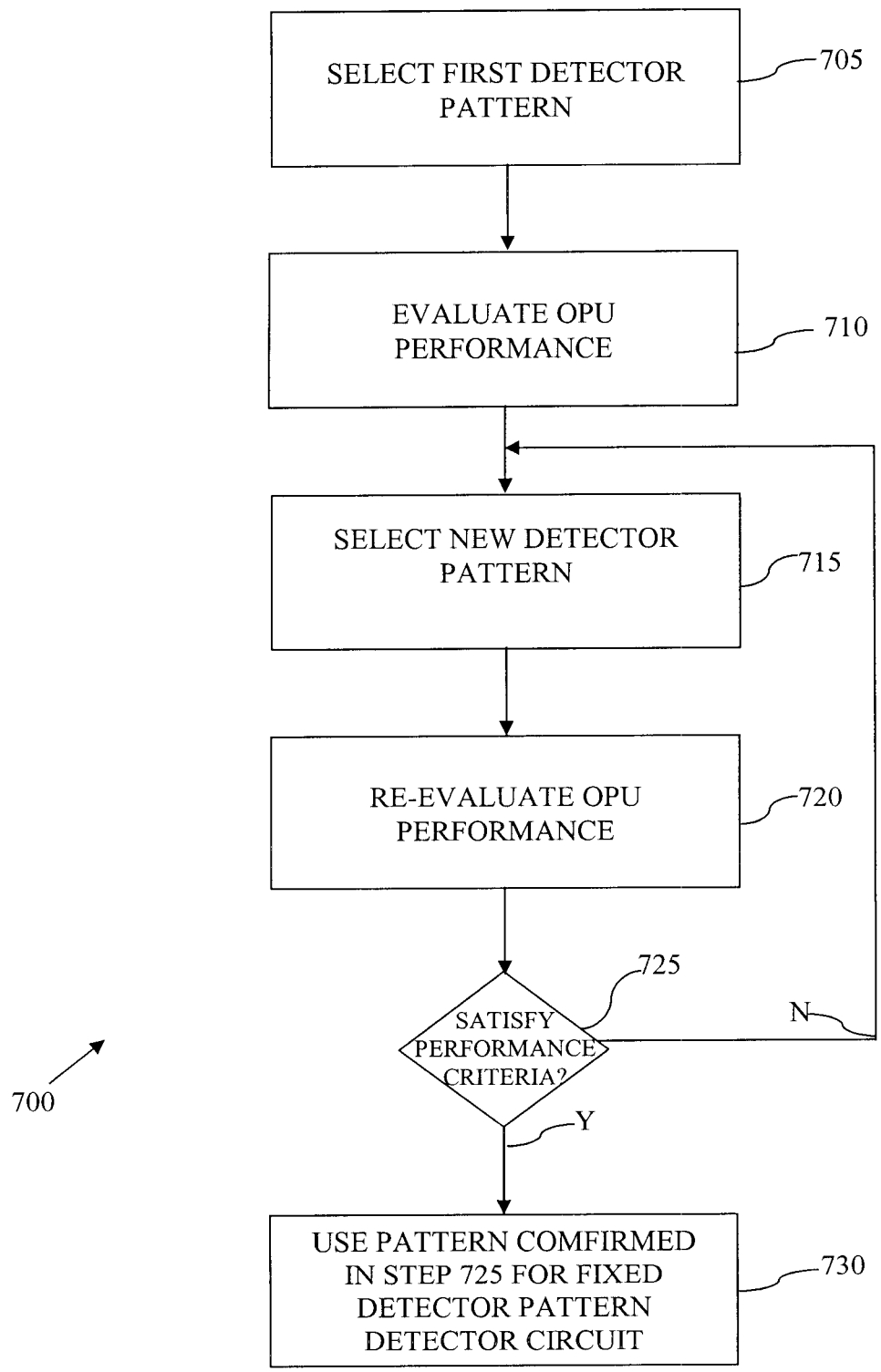
FIG. 7 is a flow chart showing an exemplary method of prototyping an OPU using a configurable photo detector circuit according to an embodiment of the invention.

FIG. 7 is a flow chart showing an exemplary method of prototyping an OPU using configurable photo detector circuits 700 according to an embodiment of the invention. At block 705, a standard or base photo detector pattern is selected. An example would be a simple quad array photo detector for the main channel and a dual or quad configuration for the two side channels generally used. At block 710, at least one performance-related parameter for the OPU is evaluated while the configurable photo detector circuit is configured in the standard or base detection pattern. The process of finding an acceptable photo detector configuration can comprise evaluating the output of the photo detector channels, evaluating SNR, optical waveforms, system parameters such as BER (bit error rates), servo tracking accuracy, each separately for one or more modes, such as CD, DVD and Blu-ray and HD-DVD modes. At block 715, a new detection pattern different from the standard or base detection pattern is selected. For example, as described above, a serial interface (I²C, SPI, or other) can be used to program the configuration of the detector pattern. The performance-related parameter is then re-evaluated at block 720 while the configurable photo detector circuit is configured in the new detection pattern. At block 725 it is determined whether the performance criteria is satisfied. If the criteria is determined to not be satisfied, the method returns to block 715 where another new detection pattern different is selected, and the performance-related parameter is re-evaluated at block 720, etc. If the criteria is determined to be satisfied, the method reaches block 730, wherein the criteria satisfying detection pattern is established for use in a fixed detection pattern photo detector comprising integrated circuit.

Depending on the results of the measured parameters and system level performance, the customer is able to modify the configuration and shape of the detection pattern of the building blocks in the configurable photo detector circuit in near real-time, thereby being able to arrive at a more optimal photo detector configuration much faster, with lower development cost, and generally being able to achieve a more optical configuration or solution given the ability to modify the PDIC detection pattern quickly and easily. This aspect provides the designer with a greater degree of freedom, allowing them to focus on the hardware portion of the optics design by gaining flexibility on the electrical and key PDIC component of the system.

As noted in the background, a significant issue the optical storage industry recently experienced is related to the introduction of interference patterns on the servo tracking signal caused by unwanted optical reflections when reading dual layer Blu-ray media. The development cycle to resolve this issue is known to be long, largely in part due to the inability to test different PDIC photo detector patterns and to rapidly evaluate the output or results. Using configurable photo detector circuits according to an embodiment of the present invention which provide a highly flexible photo detector grid array, customers can evaluate different configurations of the photo detector side channels to provide different detection patterns, to see the immediate impact to servo tracking signal integrity by allowing instant repositioning and configuration of the photo detector patterns. While the method according to this embodiment of the invention may be iterative, given the near real-time nature of the feedback and subsequent photo detector detection pattern changes, this process generally takes days instead of months or even years. Once a performance criteria satisfying detection pattern is identified, a mask set may be generated to implement the criteria satisfying detection pattern, and the mask set then used for production of a fixed detection pattern photo detector circuit.

Moreover, the future of optical storage and optical systems in general is generally rapidly changing. As the industry moves toward even greater number of data layers (beyond dual layer Blu-ray and HD-DVD media) and different technologies, the same problems with greater intensity, or new problems affecting the photo detector performance and requirements will likely emerge. Having the ability to breadboard a photo detector device using configurable photo detector circuits according to the invention is expected to prove invaluable in such situations.

Although photo detectors herein have been described using photodiodes operating in photovoltaic mode, the invention may also be practiced with photodiodes which operate in photoconductive mode since either photovoltaic or photoconductive mode outputs are adapted to be coupled to conventional amplifier arrangements. However, more generally, those having ordinary skill in the art will realize that photo detectors according to the present invention can comprise other photo detector types.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention.

Moreover, embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understood that even though various embodiments and advantages of the present Invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An apparatus comprising:
a controller;
a front end electrically coupled to the controller;
a light source configured to emit light, the light source electrically coupled to the controller, wherein a portion of the light is reflected from a surface;
a first photo detector configured to receive the light directly from the light source and to convert the light received directly from the light source into first electrical signals; and
a photo detector circuit including:
a photo detector array including a plurality of second photo detectors each having outputs and configured to receive the portion of the light reflected from the surface and to convert the portion of the light reflected from the surface into second electrical signals;
a switching matrix having a first plurality of inputs coupled to the outputs of the second photo detectors, a second plurality of inputs, and a plurality of matrix outputs;
an output block having a plurality of inputs coupled to receive the plurality of matrix outputs and a plurality of outputs;
wherein the outputs of the second photo detectors in the photo detector array are selectively directable to any of the plurality of matrix outputs based on the second plurality of inputs;
wherein the second electrical signals from the plurality of second photo detectors are directed to respective ones of the plurality of outputs based on the switching matrix;
wherein the controller is coupled to the second plurality of inputs of the switching matrix for configuring the switching matrix to a selected switch configuration; and
wherein the controller is operable to receive commands for configuring the switching matrix; and
wherein the controller is electrically and communicatively coupled to the light source;
wherein the front end is electrically and communicatively coupled to the photo detector circuit; and
wherein the front end is configured to receive an analog data signal from the photo detector circuit, convert the analog data signal into a digital data signal, and send the digital data signal to the controller.

2. The apparatus of claim 1 wherein the controller and the front end are part of a main circuit board; and
wherein the light source, the first photo detector, and the photo detector circuit are part of an optical pick-up unit; and
wherein the apparatus further comprises a coupling cable coupling the main circuit board with the optical pick-up unit.

3. The apparatus of claim 1, wherein the controller includes an I²C serial interface.

4. The apparatus of claim 1, wherein the switching matrix comprises a plurality of PMOS FETs.

5. The apparatus of claim 1, wherein the output block comprises a plurality of amplifiers, each of the plurality of second photo detectors being switchable by the switching matrix to only one of the plurality of amplifiers in the output block or to a reference voltage level.

6. The apparatus of claim 1, wherein the output block comprises a plurality of amplifiers, wherein more than one of the plurality of second photo detectors are switchable by the switching matrix to respective ones of the plurality of amplifiers in the output block.

7. The apparatus of claim 1, wherein the controller includes a serial interface and the output block comprises a plurality of amplifiers including at least one of gain/bandwidth adjustment and offset adjustment circuitry, wherein adjustments to the gain/bandwidth and offset are provided by signals transmitted via the serial interface.

8. The apparatus of claim 1, wherein the output block comprises a plurality of amplifiers, wherein the switching matrix switchably couples outputs from any of the plurality of second photo detectors to any of the plurality of amplifiers in the output block.

9. The apparatus of claim 1, wherein the selected switch configuration is configured for a particular wavelength of the emitted light.

10. A photo detector circuit, comprising:
a photo detector array having a plurality of photo detectors;
a switching matrix having a first plurality of inputs coupled to outputs of the plurality of photo detectors, and a second plurality of inputs and a plurality of matrix outputs, and wherein the outputs of the plurality of photo detectors are selectively directable to any of the plurality of matrix outputs based on the second plurality of inputs;
a controller coupled to the second plurality of inputs of the switching matrix for configuring the switching matrix to a selected switch configuration, the controller operable to receive commands for configuring the switching matrix;
an output block having a plurality of inputs coupled to receive the plurality of matrix outputs and a plurality of outputs, wherein electrical signals from the plurality of photo detectors are directed to respective ones of the plurality of outputs based on the switching matrix; and
wherein the selected switch configuration improves detection of a particular wavelength of light by the photo detector circuit.

11. The circuit of claim 10, wherein the second plurality of inputs are operable to receive control signals which select from a plurality of different switch configurations.

12. The circuit of claim 10, wherein the controller includes an I²C serial interface.

13. The circuit of claim 10, wherein the switching matrix comprises a plurality of PMOS FETs.

* * * * *